(12) United States Patent
Calderón et al.

(10) Patent No.: US 10,884,148 B2
(45) Date of Patent: Jan. 5, 2021

(54) AMPLITUDE COMPENSATION OF REVERSE TIME MIGRATION (RTM) GATHERS FOR AVO/AVA ANALYSIS

(71) Applicant: ION GEOPHYSICAL CORPORATION, Houston, TX (US)

(72) Inventors: Carlos Calderón, Houston, TX (US); Ivan Berranger, Houston, TX (US); Wei Huang, Houston, TX (US); David Brookes, Houston, TX (US); Guoquan Chen, Houston, TX (US); Gary Martin, Houston, TX (US)

( * ) Notice: Subject to any disclaimer, the term of this patent is extended or adjusted under 35 U.S.C. 154(b) by 249 days.

(21) Appl. No.: 15/937,407

(22) Filed: Mar. 27, 2018

(65) Prior Publication Data

US 2018/0275302 A1 Sep. 27, 2018

Related U.S. Application Data (60) Provisional application No. 62/477,237, filed on Mar. 27, 2017.

(51) Int. Cl.
*G01V 1/30* (2006.01)
*G01V 1/28* (2006.01)
*G01V 1/36* (2006.01)

(52) U.S. Cl.
CPC ............ *G01V 1/307* (2013.01); *G01V 1/28* (2013.01); *G01V 1/282* (2013.01); *G01V 1/364* (2013.01);

(Continued)

(58) Field of Classification Search
CPC .......... G01V 1/307; G01V 1/28; G01V 1/282; G01V 1/364; G01V 2210/512; G01V 2210/632

See application file for complete search history.

(56) References Cited

U.S. PATENT DOCUMENTS 9,405,028 B2 2/2016 Bloor et al.
9,448,313 B2 9/2016 Balla et al.
(Continued)

FOREIGN PATENT DOCUMENTS

WO    WO2014165219 A2    10/2014

OTHER PUBLICATIONS

International Search Report and Written Opinion dated Jul. 13, 2018 in connection with International Patent Application No. PCT/US2018/024594, 12 pages.

(Continued)

*Primary Examiner* — Mohammad K Islam (57) ABSTRACT

A method of geophysical exploration in a seismic survey includes acquiring a set of seismic traces based on seismic data obtained by a seismic receiver, responsive to seismic energy reflected from a subsurface geology. Additional steps include performing reverse time migration on the seismic traces using a velocity model that represents velocity of the seismic energy propagating through the seismic medium. The migrated gathers have an amplitude based at least in part on the migration, which can be corrected by computing synthetic seismograms to provide compensated gathers. Amplitude versus offset and/or amplitude versus angle analysis can be performed on the compensated gathers, in order to generate a seismic image of subsurface structures in the survey area.

20 Claims, 10 Drawing Sheets

(52) U.S. Cl.
CPC .. *G01V 2210/512* (2013.01); *G01V 2210/632* (2013.01)

(56) References Cited

U.S. PATENT DOCUMENTS

| | | | |
|---|---|---|---|
| 2011/0286305 A1* | 11/2011 | Artman | G01V 1/282 367/38 |
| 2011/0310699 A1* | 12/2011 | Robertsson | G01V 1/282 367/21 |
| 2013/0003500 A1* | 1/2013 | Neelamani | G01V 1/28 367/73 |
| 2013/0201792 A1 | 8/2013 | Douma et al. | |
| 2014/0112099 A1 | 4/2014 | Holland et al. | |
| 2015/0124559 A1* | 5/2015 | Cha | G01V 1/362 367/7 |
| 2015/0355356 A1* | 12/2015 | Anderson | G01V 1/28 702/14 |
| 2016/0291184 A1 | 10/2016 | Coates et al. | |
| 2017/0192118 A1* | 7/2017 | Du | G01V 1/282 |
| 2018/0188399 A1* | 7/2018 | Yu | G01V 1/364 |

OTHER PUBLICATIONS

Fletcher et al. "Wavepath-consistent Effective Q Estimation for Q-compensated Reverse-time Migration" 74th EAGE conference, Copenhagen, Denmark, Jun. 7 2012, 5 pages.
Zhu et al. "Q-compensated reverse-time migration" Geophysics, vol. 79, No. 3. May 1, 2014, pp. S77-S87, 11 pages.

* cited by examiner

AMPLITUDE COMPENSATION OF REVERSE TIME MIGRATION (RTM) GATHERS FOR AVO/AVA ANALYSIS

CROSS-REFERENCE TO RELATED APPLICATIONS

This application claims priority to U.S. Provisional Patent Application Ser. No. 62/477,237, AMPLITUDE COMPENSATION OF REVERSE TIME MIGRATION (RTM) GATHERS FOR AVO/AVA ANALYSIS, filed Mar. 27, 2017, which is incorporated by reference herein, in the entirety and for all purposes.

FIELD

This disclosure relates generally to geophysical exploration, and more specifically to seismic survey and imaging techniques. Suitable applications include, but are not limited to, amplitude compensation of reverse time migration (RTM) gathers, e.g., using amplitude versus offset (AVO) and/or amplitude versus angle (AVA) techniques to generate seismic images of subsurface reservoirs and other geological structures from acquired seismic wavefield data.

BACKGROUND

Petrochemical products are ubiquitous in the modern economy, and can be found in everything from oil and gasoline to medical devices, children's toys, and a wide range of everyday household items. To meet the continuing demand for these products, oil and gas reserves must be accurately located and surveyed, so that these important resources can be effectively managed. As a result, there is an ongoing need for new seismic sensor systems, and for more advanced seismic exploration and imaging technologies.

Scientists and engineers typically utilize seismic wave-based exploration to locate new oil and gas reservoirs, and to survey and manage existing reserves over time. Seismic surveys are performed by deploying an array of seismic sensors or receivers over the region of interest, and monitoring the response to controlled emission of seismic energy via one or more seismic sources such as vibrators, air gun arrays, and explosive detonations. The response depends upon the seismic energy reflected from mineral reservoirs and other subsurface formations, allowing an image of the corresponding geological structures to be generated.

Conventional marine seismic surveys typically proceed by towing an array of seismic sensors or receivers behind a survey vessel, with the receivers distributed along one or more streamer cables. A set of air guns or other seismic sources is used to generate the seismic energy, which propagates down through the water column to penetrate the ocean floor (or other bottom surface). A portion of the seismic energy is reflected from subsurface structures, and returns through the water column to be detected in the streamer array. Alternatively, the seismic receivers can also be disposed along an ocean-bottom cable, or provided in the form of autonomous seismic nodes distributed on the seabed.

Geophysical data pertaining to subsurface structures is acquired by observing the reflected seismic energy with an array of seismic receiver components. Suitable seismic receivers include pressure sensors and particle motion detectors, which can either be provided individually or combined together in close proximity within a receiver module or seismic node. Suitable pressure sensors include hydrophones and hydrophone arrays adapted to record pressure measurements of the seismic wavefield propagating through the surrounding water column, or other seismic medium. Suitable particle motion sensors include accelerometers and geophones configured to provide single-axis or multi-axis (three-dimensional) velocity measurements, in order to characterize motion of the seismic medium in response to propagating seismic waves.

Seismic signals from the sensor arrays can be processed to reconstruct the seismic wavefield, and to generate images characterizing features of the subsurface geology, including subsurface composition and structures in and around the survey area. Suitable migration and related analysis techniques are described, e.g., in Duoma, U.S. Publication No. 2013/0201792, Method and Apparatus for Processing Seismic Data, filed Feb. 1, 2013; Hofland et al., U.S. Publication No. 2014/0112099, METHOD AND APPARATUS FOR SEISMIC NOISE REDUCTION, filed Jun. 22, 2012; and Bloor, U.S. Pat. No. 9,405,028, METHOD AND APPARATUS FOR MULTI-COMPONENT DATUMING, issued Aug. 2, 2016; each of which is incorporated by reference herein, in the entirety and for all purposes.

Across these techniques, image quality depends on the fidelity of the wavefield, creating a substantial ongoing demand for more advanced methods of reconstruction-based seismic imaging techniques. More specifically, there is a constant need for improved amplitude compensation of reverse time migration gathers and related seismic wavefield data acquired in seismic surveys, including, but not limited to, the application of advanced amplitude versus offset and amplitude versus angle techniques to generate high quality images of subsurface reservoirs and other geological structures of interest in the survey area, for identification of lithology and for quantitative interpretation (QI).

SUMMARY

Methods and system are disclosed for geophysical exploration, including seismic survey systems and related seismic imaging techniques. Depending on embodiment, amplitude compensation can be applied to reverse time migration (RTM) gathers and related seismic data acquired in a seismic survey, e.g., using amplitude versus offset (AVO) or amplitude versus angle (AVA) techniques (or both) to generate seismic images of subsurface reservoirs and other geological structures.

In some embodiments, the method includes acquiring seismic data by a seismic receiver, responsive to seismic energy propagating through at least one seismic medium in the form of a seismic wavefield, obtaining a set of seismic traces based on the acquired seismic data, based on the seismic traces and a velocity model that represents velocity of the seismic energy propagating through the at least one seismic medium, performing reverse time migration (RTM) to generate a set of migrated gathers, wherein the migrated gathers have amplitude based at least in part to the RTM method, correcting the amplitudes of the migrated gathers by computing synthetic seismograms to provide compensated gathers, performing Amplitude Versus Offset and/or Amplitude Versus Angle analysis of the compensated gathers, and generating a seismic image of subsurface structures in the survey area, based on that Amplitude Versus Offset and/or Amplitude Versus Angle analysis.

DETAILED DESCRIPTION

As exploration efforts progress into ever more complex geological environments, correspondingly more advanced and complex imaging algorithms can be required to form reliable images. One-way wave equation approaches may have been adequate in simple passive margin environments; in more complex geology, however, two-way algorithms like Reverse Time Migration can be relied upon to improve image quality.

This imaging solution can be implemented on computer systems deploying algorithms to offer RTM at higher frequencies, facilitating a transition from structurally oriented RTM to stratigraphically oriented, higher frequency RTM. As compared to using RTM for lower frequency migrations, for example about 20 Hz or lower, more stratigraphic content can be imaged by 3D analysis up to 80 Hz or higher, in order to generate not only the structural images that lower frequency migration provides, but also the higher frequencies needed to clearly identify the stratigraphic elements within a given geological structure of interest.

Balancing the data can also impact data quality of the data, including, but not limited to, both shot by shot and global balancing, depending on the needs of a particular survey. In addition, the algorithm allows for more flexibility beyond the migration itself, including outputting both stack and illumination volumes, and a wide variety of gathers, as described herein.

Gathers are a primary output of migration algorithms. They are used to facilitate velocity model building, for enhancement of the stacked image, and for post-migration attribute generation such as AVO and inversion. Some traditional wavefield extrapolation migration methods, however, do not necessarily produce suitable gathers, or suitable migrated gather data, and may instead primarily output data to a zero offset position. In the approach to creating gathers described here, in the case of RTM, a variety of gather types are provided to meet various imaging needs, including, but not limited to, offset and vector offset based on the space-shifted imaging condition, time-shifted, and angle and vector angle based on Poynting vectors (e.g., Poynting vector gathers).

The most typical and utilized imaging condition used in Reverse Time Migration bypasses deconvolution by the incident wavefield due to lack of numerical stability and computing cost, which results in inaccurate amplitudes in output migrated gathers. For amplitude compliant offset and angle migrated gathers, a robust scheme is developed that compensates the amplitudes of Reverse Time Migration (RTM) gathers in such a way that the resulting gathers can be utilized for Amplitude Versus Offset (AVO) and/or Amplitude Versus Angle (AVA) analysis. The scheme does not rely on an iterative procedure to correct for the amplitudes. In the case of angle gathers, the method works irrespectively of the angle transformation.

Figure 1:
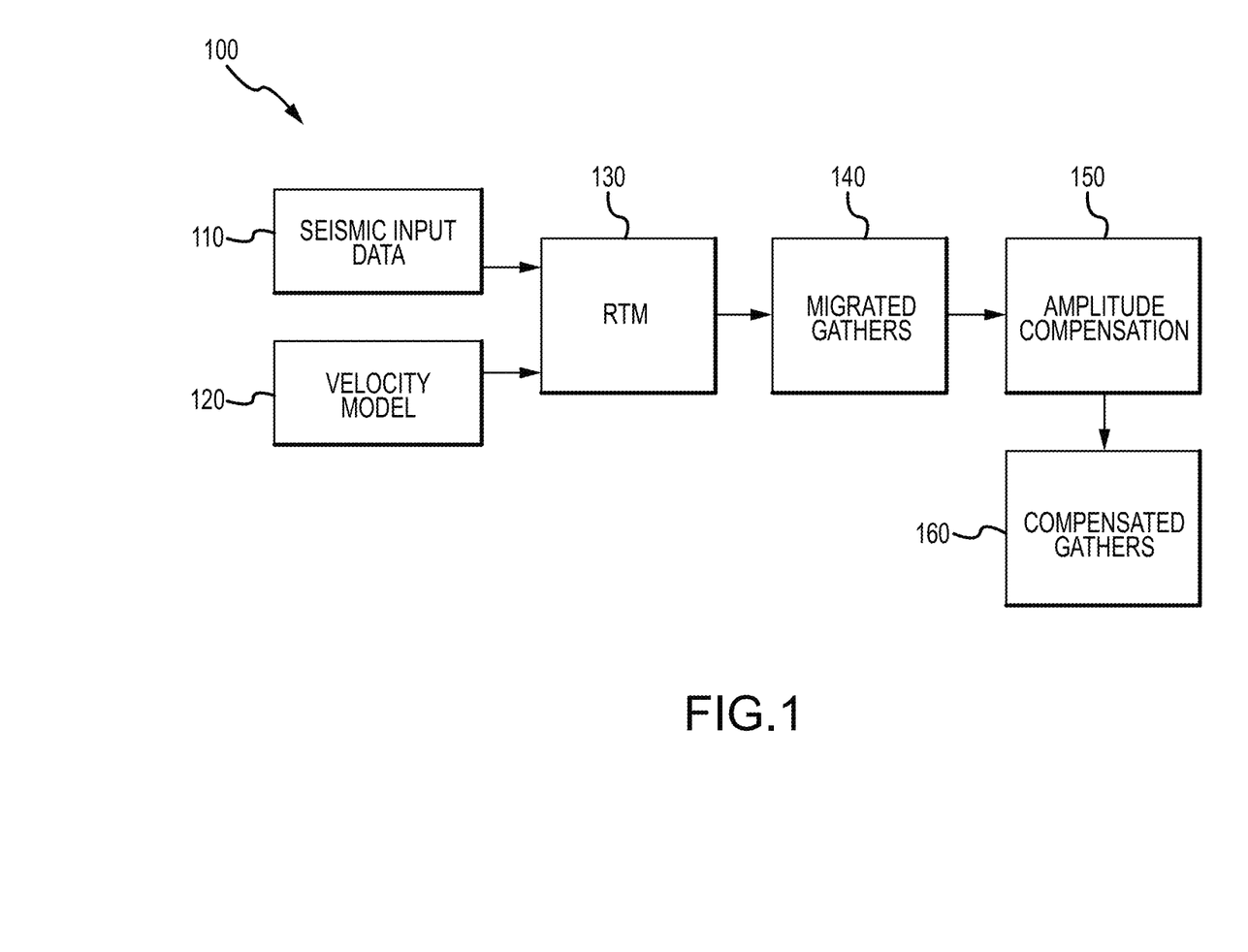
FIG. 1 is a block diagram depicting process flow for recovering amplitudes in reverse time migration for amplitude versus offset and/or amplitude versus angle analysis.

FIG. 1 is an RTM amplitude recovery flow diagram 100; e.g., in the form of a block diagram depicting process flow for recovering amplitudes in reverse time migration for amplitude versus offset and/or amplitude versus angle analysis. More specifically, FIG. 1 is a block diagram depicting process flow for recovering amplitudes in reverse time migration for amplitude versus offset and/or amplitude versus angle analysis.

As shown in FIG. 1, seismic input data (step 110) and a velocity model (step 120) are used for reverse time migration (step 130), generating migrated gathers (step 140). Amplitude compensation (step 150) is performed to generate compensated gathers (step 160), for use in imaging the subsurface structure.

FIG. 1 depicts the flow for recovering the amplitudes in RTM for AVO/AVA analysis. Seismic traces (step 110) and a velocity model (step 120) are the inputs to RTM (step 130). The velocity model used for migration is a relatively smooth model that may contain high reflectivity contrasts such as a water bottom interface and salt-sediment boundaries and can incorporate anisotropy. The output domain of the migrated gathers (step 140) could be in offset, sub-surface offset, time shift or angle gather. Amplitudes are then corrected; e.g., post-migration (steps 150, 160).

Migration of the seismic data builds an image of the Earth's interior surface from recorded field data, by repositioning the data to their "true" geological position in the subsurface; e.g., using numerical approximations from a wave or ray-based model or description of the propagation of sound waves in the subsurface. The migration can be performed in a number of stages, for both ray and wave-extrapolation based methods. The final stage of the migration process is that which forms the image, via an imaging condition.

Figure 2A:
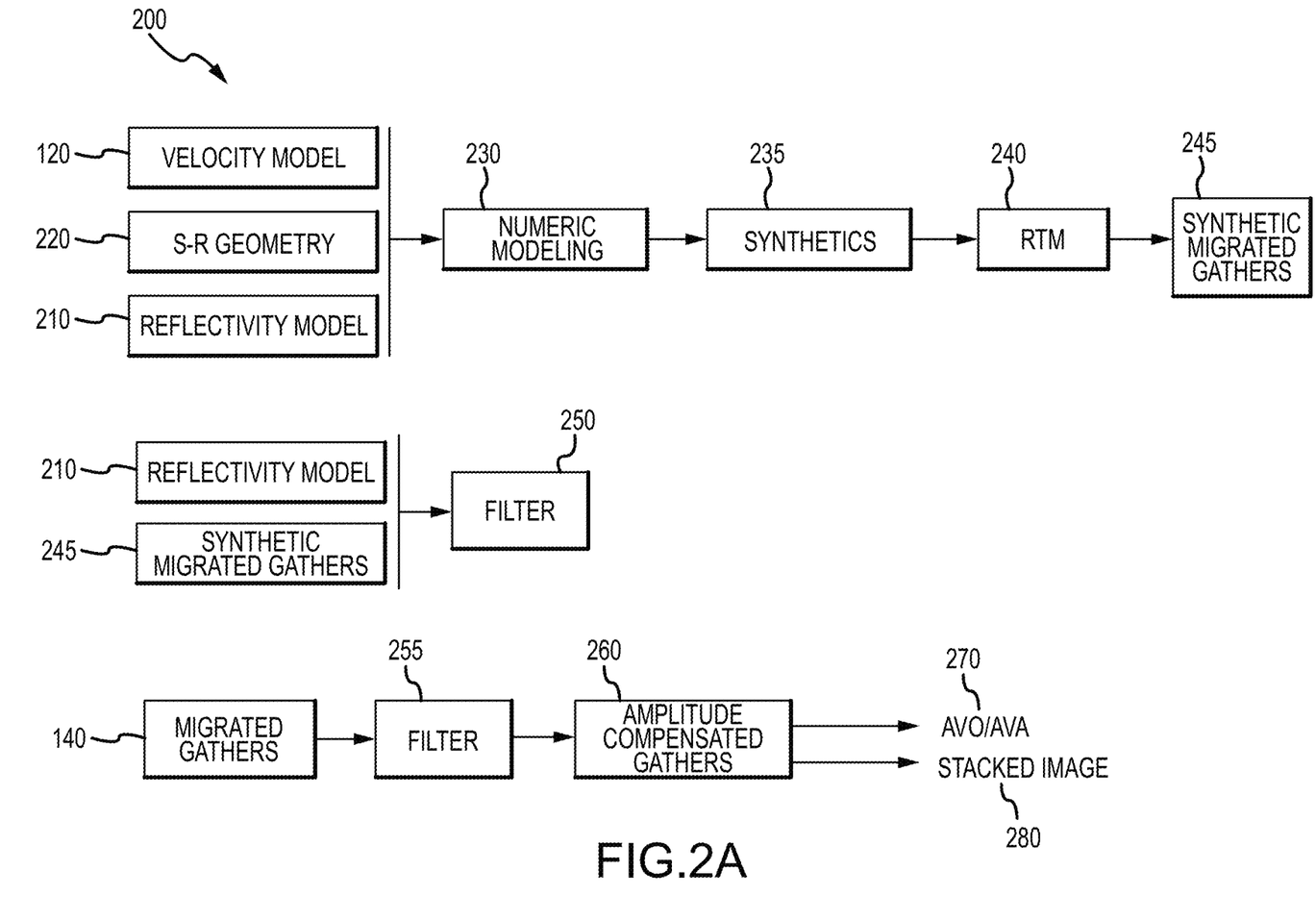
FIG. 2A is a block diagram illustrating an amplitude compensation algorithm suitable for use with the process flow illustrated in the block diagram of FIG. 1.

FIG. 2A is a detail view of an amplitude compensation algorithm or process 200; e.g., in the form of a block diagram illustrating an amplitude compensation algorithm suitable for use with the process flow illustrated in the block diagram of FIG. 1. As shown in FIG. 2A, the amplitude compensation process 200 includes generating or providing one or more of a velocity model (step 120), a reflectivity model (step 210), and source-receiver geometry (step 220), which are used for numeric modeling (step 230), synthetics (step 235), RTM (step 240), and generating synthetic migrated gathers (step 245). The reflectivity model (step 210) and synthetic migrated gathers (step 245) used to generate a filter or filter algorithm (step 250). The migrated gathers (step 140) are filtered (step 255) to generate amplitude compensated gathers (step 260); e.g., for AVO/AVA processing (step 270) and imaging (step 280).

FIG. 2A thus describes steps comprised in the amplitude compensation algorithm or process 200. In the first set of steps of process 200 in FIG. 2A, synthetic seismograms are computed (step 235) by numeric modeling (step 230), using a process of, based on or akin to the inverse process of migration, sometimes referred to as Born modeling.

Inputs to the modeling (step 230) are the same velocity model 120 used for migrating the seismic data in FIG. 1, an ad hoc reflectivity grid model (step 210) of the same or similar dimensions as the velocity model, and a source-receiver geometry (step 220) matching the geometry of the seismic data in FIG. 1 (step 110). The reflectivity model (step 210) is composed of a set of horizontal reflectors that span the space of the output migrated data.

The computed synthetic seismograms (step 235) contain primary reflections created by the reflectivity model (step 210) with amplitudes that are solely or substantially due to transmission effects, but in contrast to the real seismic traces they may lack amplitude variations with offset introduced by elastic property contrasts of the real subsurface geology. The synthetic seismograms are then migrated with RTM (step 240), resulting in gathers (step 245) in the same domain of the migrated seismic traces of FIG. 1.

Due to amplitude distortions introduced by RTM, the amplitudes of the migrated synthetic gathers (step 245) may not match the amplitudes of the input ad hoc reflectivity model (step 210). This difference is used in the second set of steps of process 200 in FIG. 2A to estimate a scalar correction filter (step 250) that compensates for the distortion at each reflectivity horizon level. The scalar filter (step 250) is then interpolated in the depth axis to produce a gridded volume of scalar filters (step 255) that are applied to the migrated seismic traces of FIG. 1 (step 140) to produce amplitude compensated gathers (step 260) as indicated in the third set of steps of process 200 in FIG. 2A. An added possibility of interpolation is in the offset or angle axis. This is because in computing the RTM gathers from synthetics (steps 210, 245, 250), one may sample the angle or offset axis coarser than for the input migration (in steps 130-140), and then employ interpolation to save compute time, making the algorithm and processing system more efficient.

Suitable amplitude compensated gathers (step 260) can be generated in a number of forms, e.g., offset gathers or vector offset gathers based on a space-shifted imaging condition, time-shifted gathers, and angle or vector angle gathers based on Poynting vectors (e.g., Poynting vector gathers). The amplitude compensated gathers (step 260) can be utilized for Amplitude Versus Offset (AVO) analysis or Amplitude Versus Angle (AVA) analysis, or both (step 270), in order to generate stacked images representative of the subsurface geology (step 280). Alternatively, one or both of the AVA/AVO (step 270) and stacked imaged (280) processing stees can be performed independently, or in parallel.

The amplitude compensation process 200 restores amplitudes in depth and offset, subsurface-offset, time shift, angle or any other horizontal spatial axis. The compensation is robust given the fact that the migration velocity model (step 120) is often a relatively smooth model. As a result image generation (step 280) is improved, provided higher fidelity images of the complex geological structures and other subsurface geology.

Figure 2B:
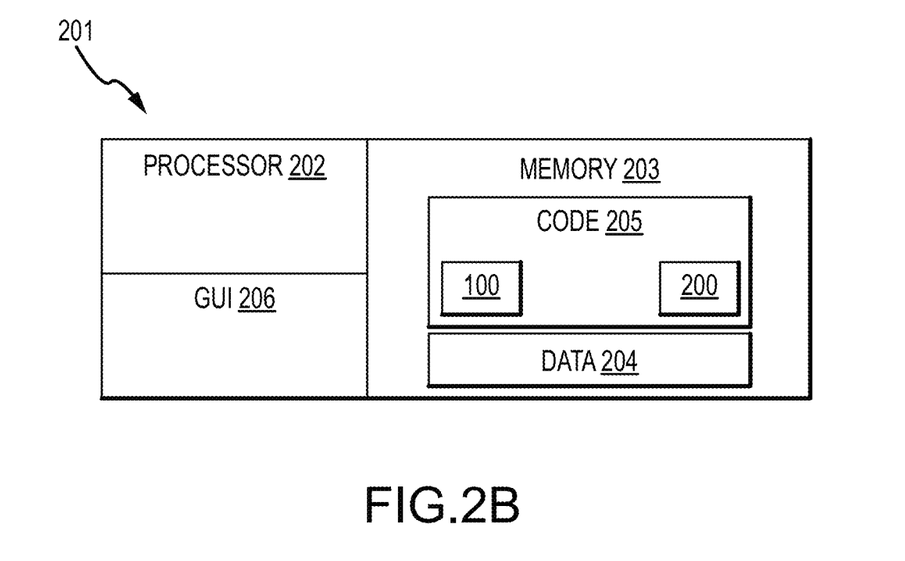
FIG. 2B is a block diagram of a computer imaging system configured to perform seismic data processing, modeling and imaging according to the methods of FIGS. 1 and 2A.

FIG. 2B is a block diagram of a computer seismic imaging system 201 configured to perform seismic data processing, modeling and imaging according to methods 100 and 200 of FIGS. 1 and 2A. As shown in FIG. 2B, a suitable seismic imaging system 201 can include a computer processor 202 coupled with a combination of volatile and non-volatile (non-transitory) memory 203 for storing seismic data 205 and code 205, which can be executed on the processor 203 to perform data processing and imaging according to methods 100 and 200. A visual display or graphical user interface (GUI) 206 is provided for outputting the processed seismic data; e.g., in the form of seismic images representative of the subsurface geology.

Figure 3A:
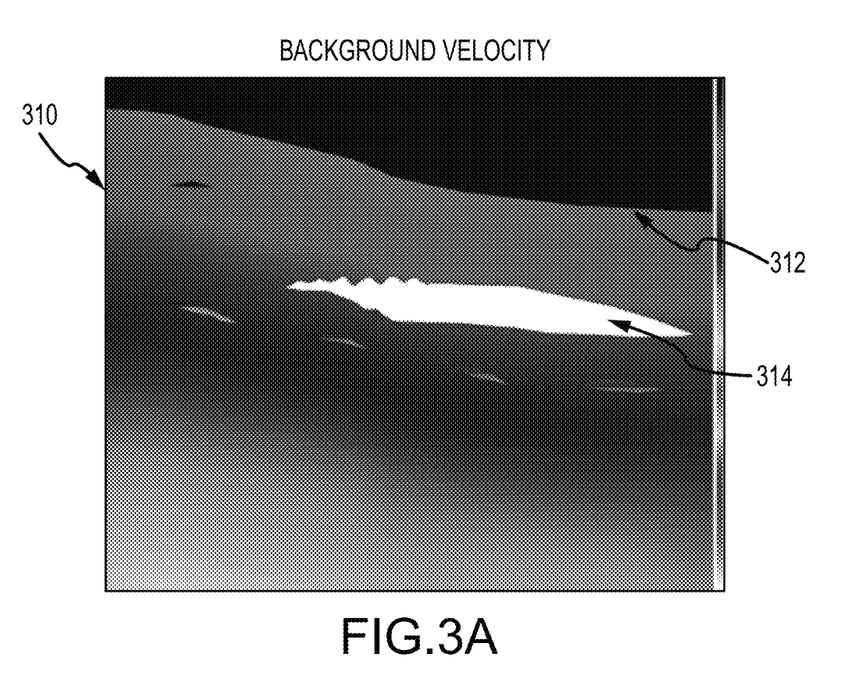
FIG. 3A is a schematic illustration of a smooth velocity field or background velocity model.
Figure 3B:
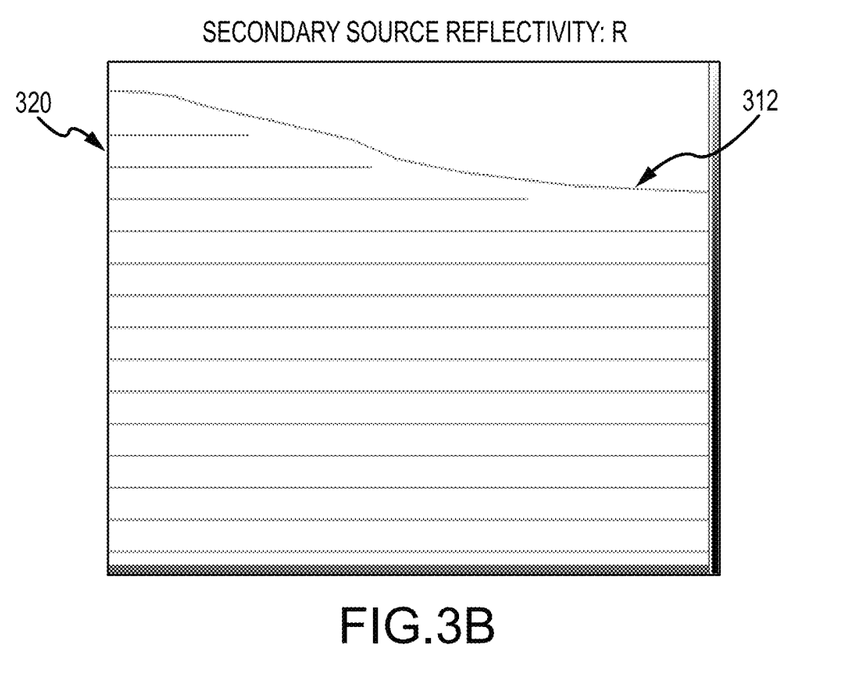
FIG. 3B is a schematic illustration of a reflectivity R; e.g., a secondary source reflectivity overlying the background velocity.

FIG. 3A is a schematic illustration of a representative smooth velocity field or velocity model 310; e.g., a background velocity. FIG. 3B is a schematic illustration of a reflectivity R or reflectivity model 320; e.g., a secondary source reflectivity overlaying the background velocity. In these figures, depth is plotted on the vertical axis, with xline position on the horizontal axis.

Whereas the initial model may typically have a smooth velocity field, a detailed interpretation of the water bottom (for marine data) and surface topography (for land data) can be incorporated; e.g., including relevant bottom features and subsurface structures 312, 314, etc. The information used to build the initial model may come from time-domain information such as picked time horizons, stacking velocity fields, interval velocities, vertical compaction gradients or well information, and anisotropic parameter estimates if available.

Figure 4A:
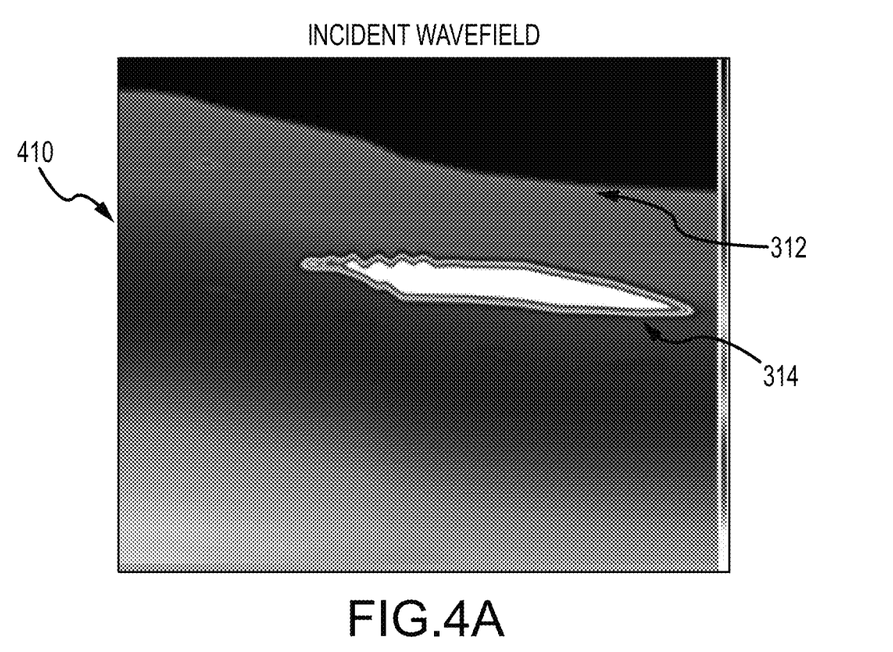
FIG. 4A is a schematic illustration of a velocity background model at which an incident wavefield propagates.
Figure 4B:
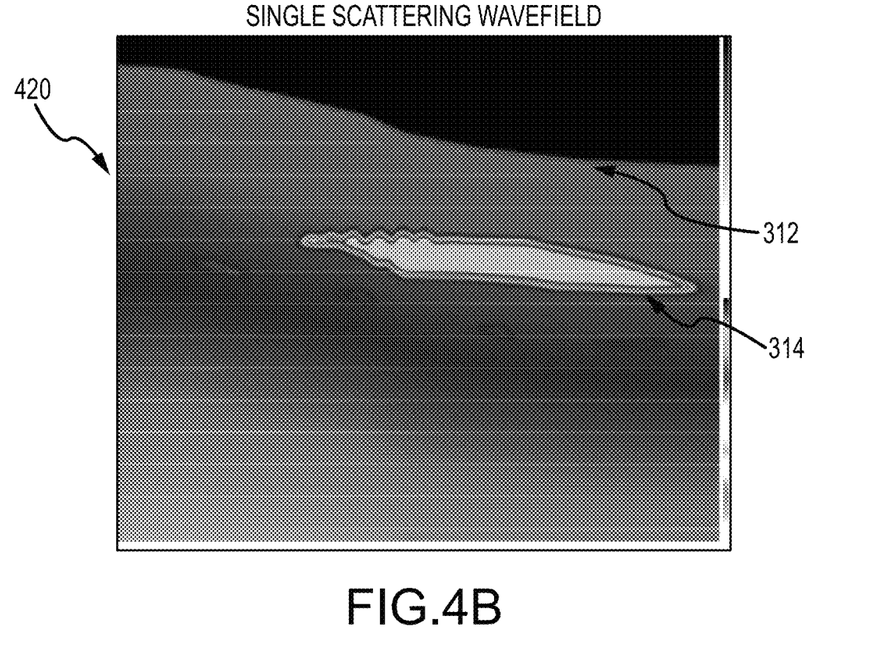
FIG. 4B is a schematic illustration of a model and reflectivity for generating the scattered wavefield, e.g., a single scattering wavefield.

FIG. 4A is a schematic illustration of a velocity model at which the incident wavefield 410 propagates; e.g., where the reflectivity 320 scatters the incident wavefield 410. FIG. 4B is a schematic illustration of the velocity model and reflectivity that scatters the wavefield; e.g., a single scattering wavefield that does not interact with the reflectivity 320. In these figures, depth is plotted on the vertical axis, with xline position on the horizontal axis.

The recorded signal is the upward propagating wavefield as measured at the receivers; e.g., based on the Earth's reflectivity response and the background model, convolved with the downward going source wavelet. There may be velocity contrast at the layer boundaries.

As shown in FIGS. 3A, 3B, 4A and 4B, the inputs to the Born modeling process 200 can include a smooth velocity field 310 (FIG. 3A); e.g., suitable for use as a velocity model (step 120), and a reflectivity 320 (FIG. 3B) that scatters an incident wavefield 410 (FIG. 4A), which may be suitable for use as a reflectivity model (step 210). The scattered wavefield 420 (FIG. 4B) can be independent of and not interact with the reflectivity; e.g., depending on embodiment, internal multiples are not necessarily modeled, and no internal multiples may be modeled.

Figure 5:
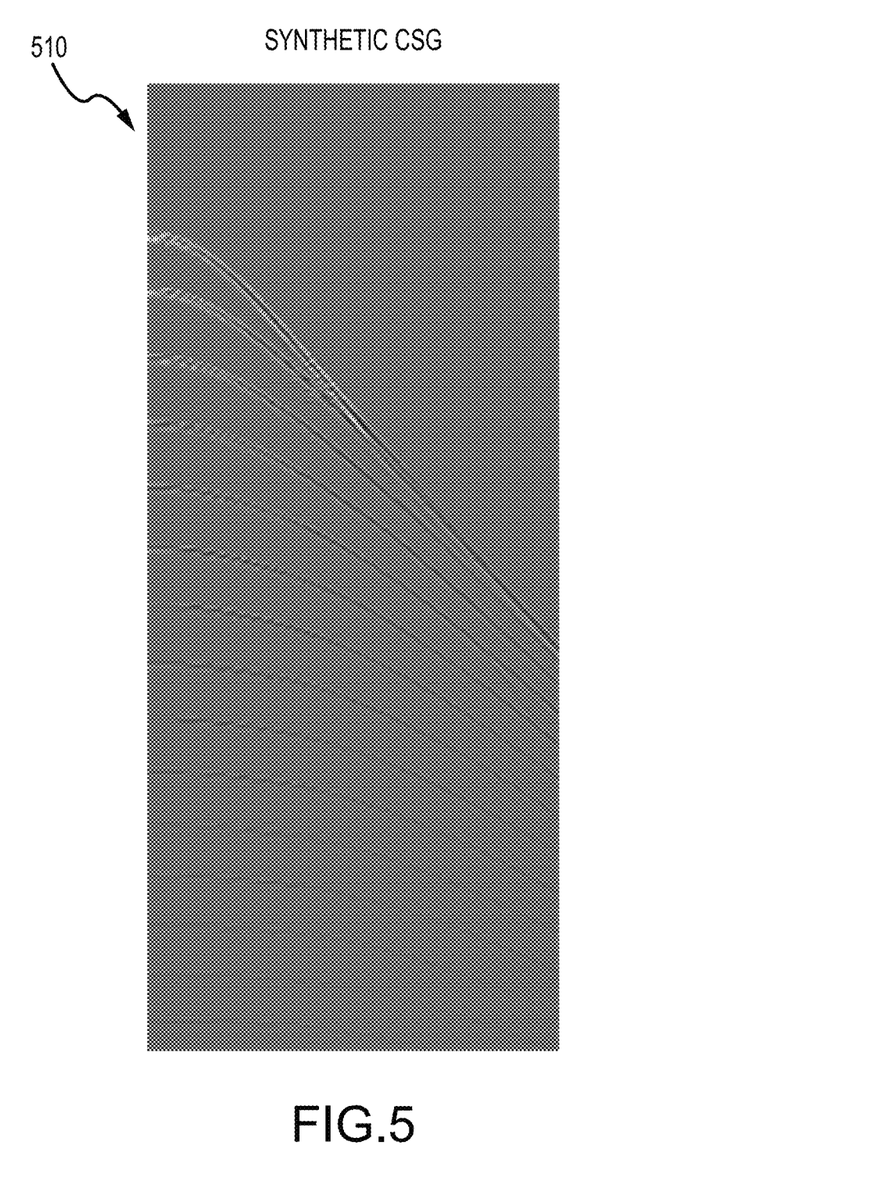
FIG. 5 is a representative synthetic CSG plot.

FIG. 5 is a representative synthetic CSG plot 510. For example, CSG plot 510 may be representative of computed synthetic seismograms according to step 235 of method 200 as shown in FIG. 2, either alone or in combination with any one or more additional process steps performed to produce amplitude compensated gathers, as disclosed herein.

The nature of the problem can thus be outlined with synthetic data derived from the model; e.g., with a smooth background velocity field. The appearance of the final migrated image will depend, inter alia, on the interplay of AVO and migration velocity.

Figure 6:
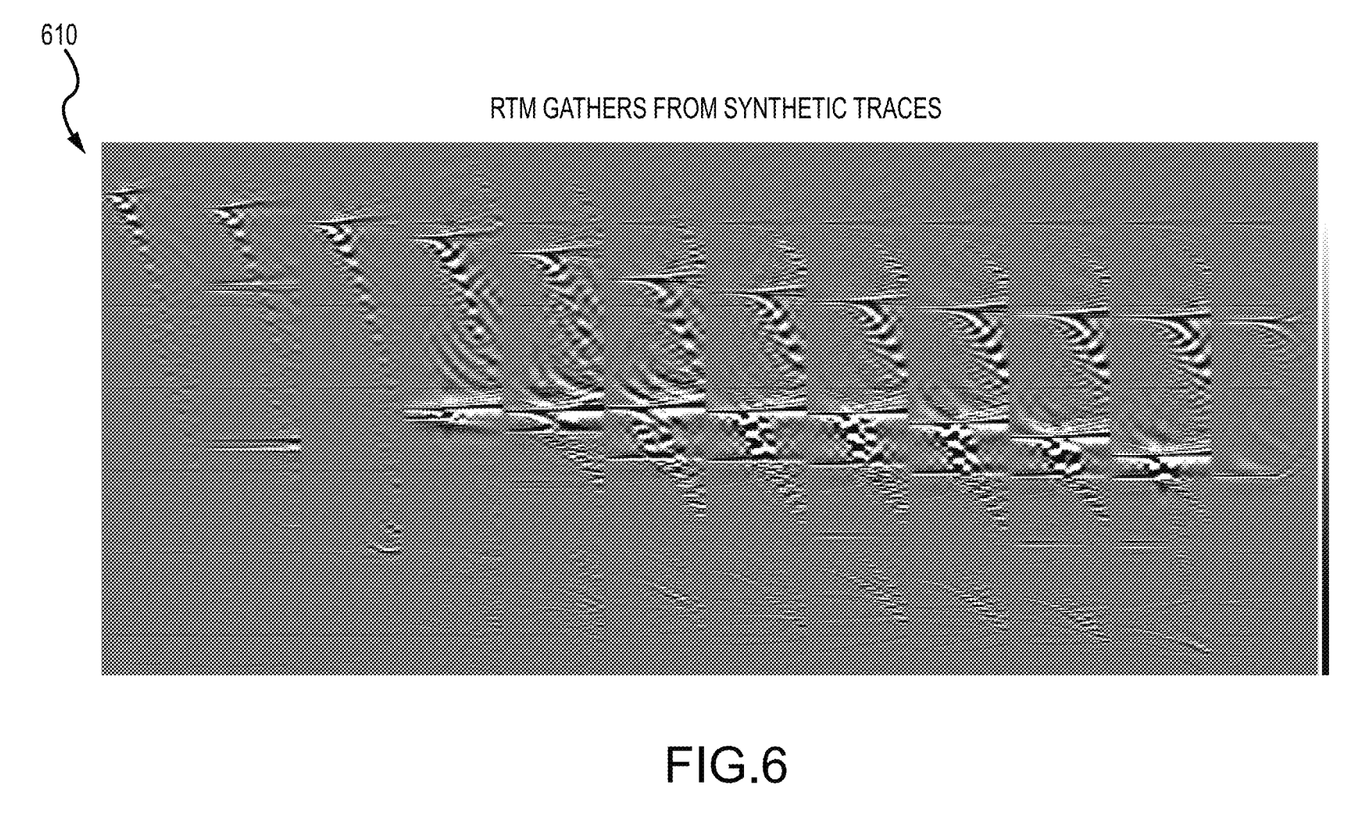
FIG. 6 is a plot of representative RTM surface offset gathers from synthetic traces.

FIG. 6 is a plot of representative RTM surface offset gathers 610 from synthetic traces. In this figure, depth is plotted on the vertical axis, with xline/offset on the horizontal axis. For example, RTM gathers 610 from synthetic traces may be representative of synthetic migrated gathers according to step 245 of method 200 as shown in FIG. 2, either alone or in combination with any one or more additional process steps performed to produce amplitude compensated gathers, as disclosed herein.

Figure 7:
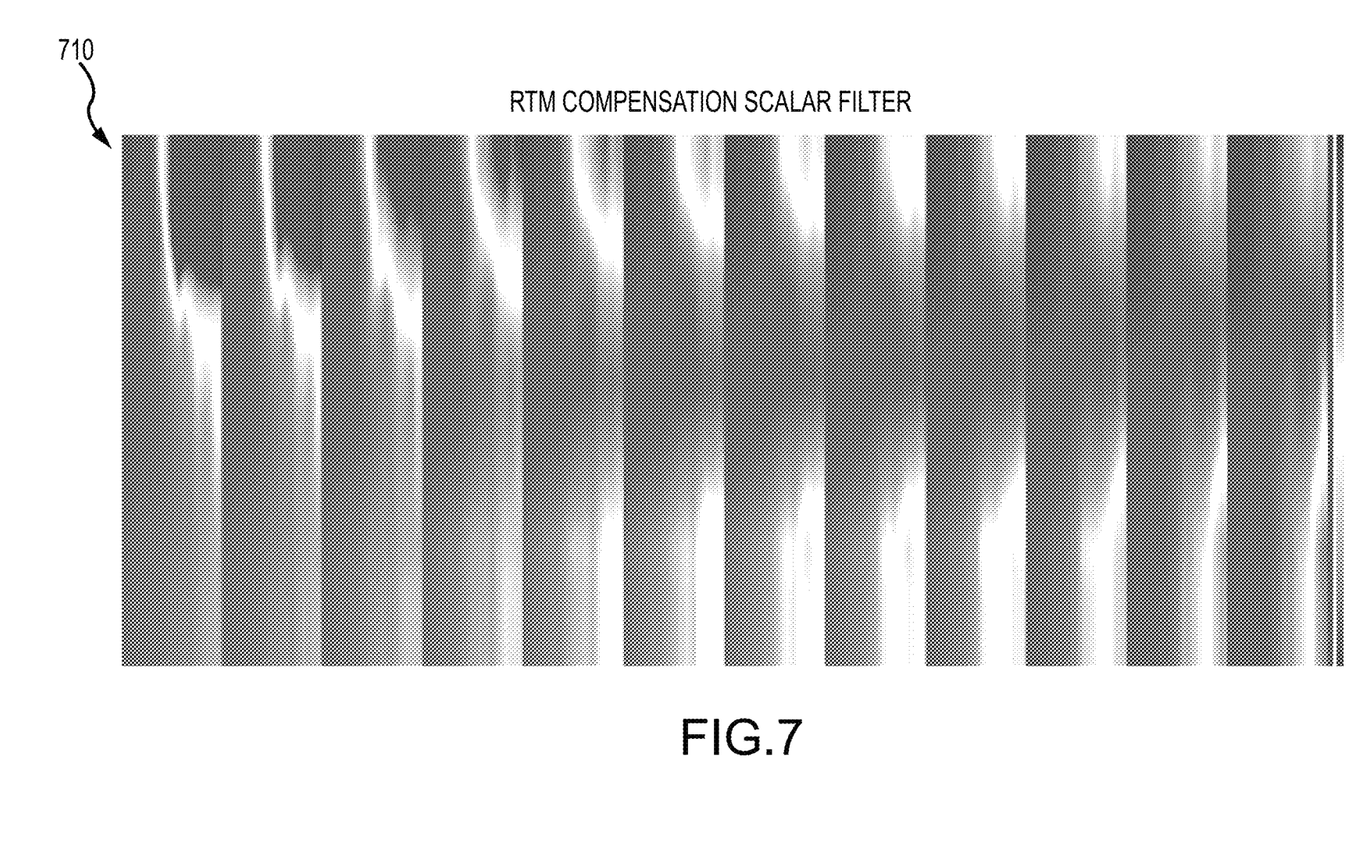
FIG. 7 is a plot of representative RTM amplitude compensation surface offset scalar filters.

FIG. 7 is a plot of representative RTM amplitude compensation surface offset scalar filters 710. Depth is plotted on the vertical axis, with xline/offset on the horizontal axis. For example, RTM scalar filter data 710 may be representative of scalar correction filter data that compensate for distortion at each reflectivity horizon level according to step 250 of method 200 as shown in FIG. 2, or such data interpolated in the depth axis to produce a gridded volume of scalar filters applied to the migrated seismic traces according to step 255, either alone or in combination with any one or more additional process steps performed to produce amplitude compensated gathers, as disclosed herein.

Figure 8:
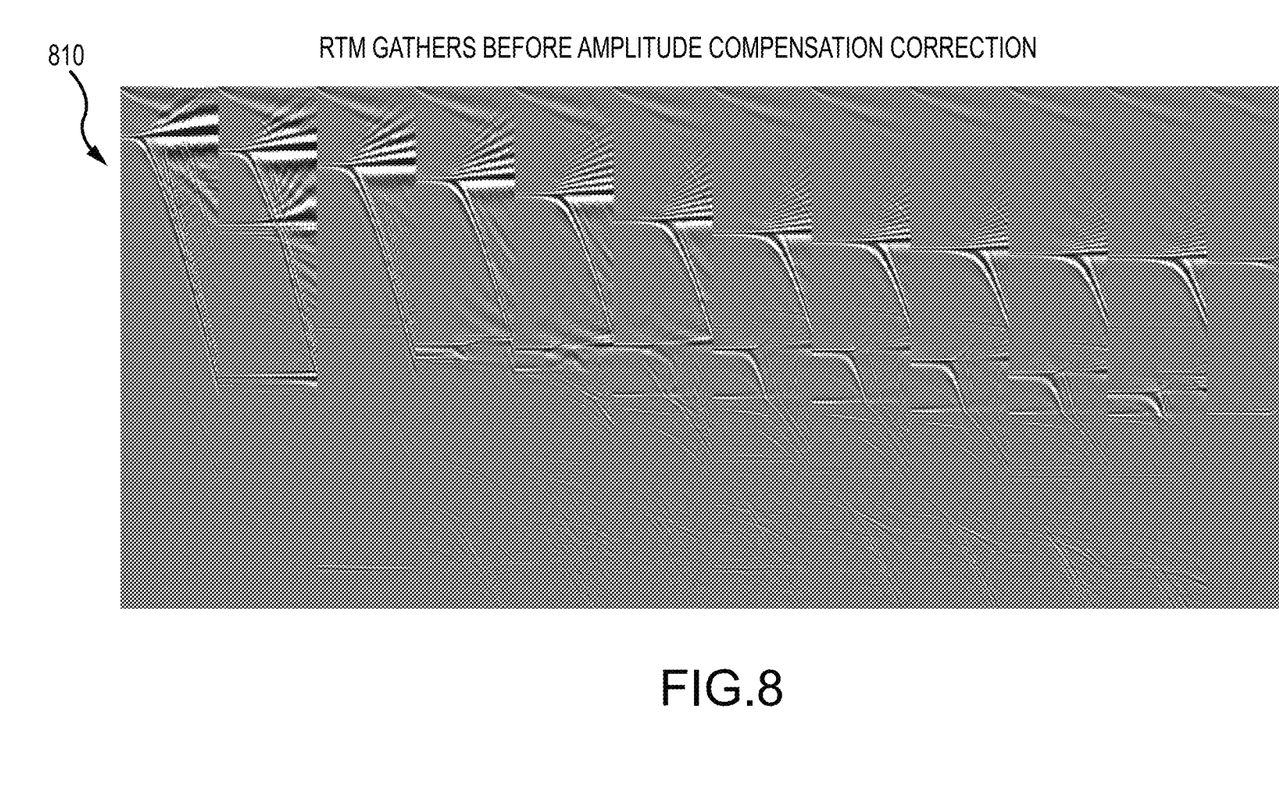
FIG. 8 is a plot of representative input RTM surface offset gathers before amplitude compensation correction.

FIG. 8 is a plot of representative input RTM surface offset gathers 810, before amplitude compensation correction. Depth is plotted on the vertical axis, with xline/offset on the horizontal axis. For example, RTM gathers 810 may be representative of migrated seismic traces according to step 140 of method 100 as shown in FIG. 1, before a gridded volume of scalar filters are applied to the migrated seismic traces according to step 255 of process 200, either alone or in combination with any one or more additional process steps performed to produce amplitude compensated gathers, as disclosed herein.

Figure 9:
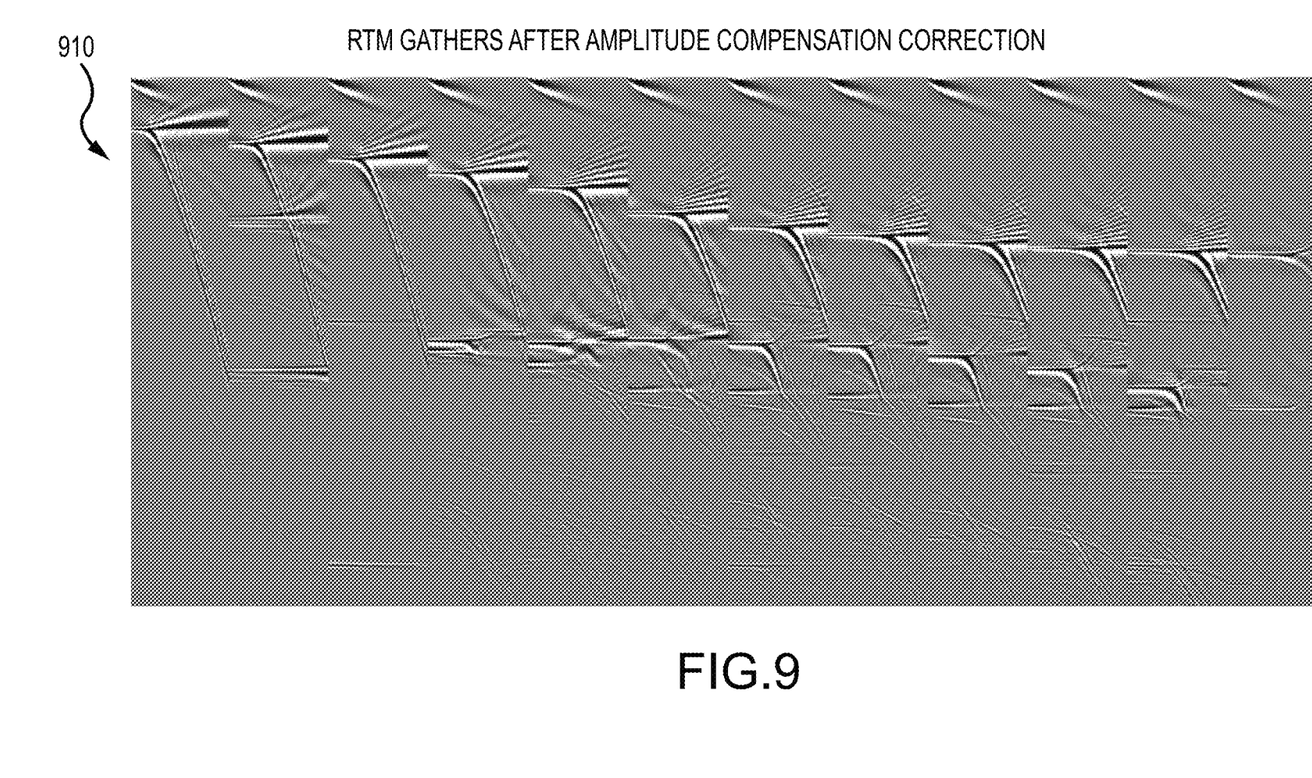
FIG. 9 is a plot of representative RTM surface offset gathers after amplitude compensation correction.

FIG. 9 is a plot of representative RTM surface offset gathers 910, after amplitude compensation correction. Depth is plotted on the vertical axis, with xline/offset on the horizontal axis. For example, RTM gathers 910 may be representative of migrated seismic traces according to step 140 of method 100 as shown in FIG. 1, after a gridded volume of scalar filters are applied to the migrated seismic traces according to step 255 of process 200, either alone or in combination with any one or more additional process steps performed to produce amplitude compensated gathers, as disclosed herein.

Correcting the amplitude of the recorded signal can help compensate for variation in source output and receiver coupling, and provide a more stable correction in the presence of noise. Real data examples can also show that compensation enhances the higher-frequency components in complex geological structures. These amplitude compensation techniques can also be used in combination with other seismic imaging procedures to improve resolution of the subsurface structures, including, but not limited to, those disclosed in U.S. patent application Ser. No. 15/375,471, SYSTEM AND METHOD FOR TIME DOMAIN RECONSTRUCTED WAVEFIELD FWI TDRWFI, filed Dec. 12, 2016, and U.S. patent application Ser. No. 15/847,846, SYSTEM AND METHOD FOR RECONSTRUCTED WAVEFIELD IMAGING, filed Dec. 19, 2017, each of which is incorporated by reference herein, in the entirety and for all purposes.

A method of seismic imaging is provided, the method comprising one or more steps of: obtaining seismic data acquired by a seismic receiver comprising at least one of a geophone and a hydrophone deployed to a seismic medium, the seismic data responsive to seismic energy generated by at least one seismic source and propagating through the seismic medium by reflection from a subsurface geology; and obtaining a set of seismic traces based on the acquired seismic data, each of the seismic traces including one or more samples of the seismic energy. Depending on embodiment the method may also include one or more additional steps of: generating a set of migrated gathers by performing reverse time migration on the seismic traces using a velocity model of the seismic energy propagating through the seismic medium, wherein the migrated gathers have amplitudes based at least in part on the reverse time migration and the velocity model; generating synthetic migrated seismograms based on the velocity model and a source-receiver geometry representative of the at least one source and seismic receiver; generating a filter based on the synthetic migrated gathers; generating amplitude compensated gathers from the migrated gathers, wherein the filter is applied to correct the amplitudes; and generating a seismic image of the subsurface geology, based on the amplitude compensated migrated gathers. The method may further comprise amplitude versus offset or amplitude versus angle analysis of the amplitude compensated gathers, or both, where the seismic image is based at least in part on the analysis.

In any embodiment, the method may further comprise numeric modeling of synthetic seismograms based on the velocity model and the source-receiver geometry and migrating the synthetic seismograms with reverse time migration to provide the synthetic migrated gathers in a same output domain as the migrated gathers. For example, the output domain may be at least one of offset, sub-surface offset, time shift, or angle gather. For example, the numeric modeling may be based on a reflectivity model of the seismic medium, the reflectivity model having same dimensions as the velocity model and being representative of a set of reflectors that span a space of the migrated gather, wherein the source-receiver geometry matches a geometry of the seismic traces.

In some of these applications, the synthetic seismograms are representative of primary reflections based on the reflectivity model with amplitudes due to transmission effects, and wherein the synthetic seismograms lack amplitude variations with offset introduced by elastic property contrasts of the subsurface geology. In further applications, generating the filter comprises estimating a scalar correction filter based on a difference in amplitudes of the migrated gathers and amplitudes of the reflectivity model, wherein the scalar correction filter compensates for the distortion at each reflectivity horizon level in the reflectivity model.

In other embodiments, the method may further comprise interpolating the scalar correction filter in a depth axis to produce a gridded volume of scalar filters, wherein applying the filter comprises applying the scalar filters to the migrated gathers to provide the amplitude compensated gathers. In further applications, the velocity model may represent the background velocity and the amplitude may comprise distortion due at least in part to the reverse time migration, and correcting the amplitudes may comprise reducing the distortion. In other applications, where the velocity model contains reflectivity contrasts and includes a water bottom interface, the velocity model may be anisotropic.

A method of geophysical exploration is provided, the method comprising: detecting, by a seismic receiver, seismic energy in a seismic medium through which a seismic wavefield propagates; obtaining a set of seismic traces based on the detected seismic energy, wherein the seismic traces are responsive to the seismic wavefield being reflected from a subsurface geology; reverse time migrating the seismic traces to generate migrated gathers based on a velocity model of the seismic medium, wherein the migrated gathers have amplitude distortion due to the reverse time migration; numeric modeling of synthetic traces based on the velocity model and a source-receiver geometry matching a geometry of the seismic traces; reverse time migrating the synthetic gathers to generate synthetic migrated gathers; generating amplitude compensated gathers from the migrated gathers, wherein a filter based on the synthetic migrated gathers is applied to at least partially correct the amplitude distortion; and generating a seismic image of the subsurface geology by performing one or both of amplitude versus offset and amplitude versus angle analysis of the amplitude compensated gathers.

In any embodiment, the velocity model may be anisotropic and may contain reflectivity contrasts including a water bottom interface. In further applications, the method may further comprise performing the reverse time migrating of the synthetic seismograms to generate the synthetic migrated gathers in a same output domain as the migrated gathers, wherein the output domain is at least one of offset, sub-surface offset, time shift, or angle gather.

In some embodiments, the method may generate the filter based on a difference in amplitudes of the synthetic migrated gathers and a reflectivity model of the seismic medium, the reflectivity model representing a set of reflectors that span a space of the migrated gathers. In other applications, the method may further comprise estimating a scalar correction filter based on the difference in amplitudes of the synthetic migrated gathers and the reflectivity model, wherein the scalar correction filter at least partially compensates for the amplitude distortion. In further applications, the method may comprise interpolating the scalar correction filter in a depth axis and optionally in the offset or angle axis to produce a gridded volume of scalar filters and applying the scalar filters to the migrated gathers to generate the amplitude compensated gathers.

In other applications, the numeric modeling may be based on the reflectivity model, with the reflectivity model having the same dimensions as the velocity model such that the synthetic traces are representative of primary reflections created by the reflectivity model. For example, the synthetic traces may have amplitudes representative of transmission effects and lack amplitude variations with offset introduced by elastic property contrasts of the subsurface geology.

A system is provided, the system comprising a computer processor and non-transitory memory for storing program code executable on the computer processor to perform a method of seismic imaging, the method comprising: obtaining a set of seismic traces based on seismic energy detected by a seismic receiver deployed to a seismic medium through which a seismic wavefield propagates, wherein the seismic traces are responsive to the seismic wavefield reflected from a subsurface geology; reverse time migrating the seismic traces to generate migrated gathers based on a velocity and a reflectivity model of the seismic medium, wherein the migrated gathers have amplitude distortion due to the reverse time migration; numeric modeling of synthetic traces based on the velocity model, a reflectivity model of the seismic medium having a same dimension as the velocity model, and a source-receiver geometry matching a geometry of the seismic traces; reverse time migrating the synthetic gathers to generate synthetic migrated gathers; generating a filter based on a difference in amplitudes of the synthetic migrated gathers and the reflectivity model, the reflectivity model representing a set of reflectors that span a space of the migrated gathers; generating amplitude compensated gathers from the migrated gathers, wherein the filter is applied to at least partially correct the amplitude distortion; and generating a seismic image of the subsurface geology by performing one or both of amplitude versus offset and amplitude versus angle analysis of the amplitude compensated gathers.

In some embodiments, generating the filter may comprise: estimating a scalar correction filter based on the difference in amplitudes of the synthetic migrated gathers and the reflectivity model, wherein the scalar correction filter at least partially compensates for the amplitude distortion; and interpolating the scalar correction filter in a depth axis, or in the depth axis and in the offset or angle axis, in order to produce a gridded volume of scalar filters; wherein applying the scalar filters are applied to the migrated gathers to generate the amplitude compensated gathers.

Methods are provided for geophysical exploration in a seismic survey area, comprising one or more steps of: acquiring, by a seismic receiver comprising at least one of a geophone and a hydrophone, seismic data responsive to seismic energy propagating through at least one seismic medium in the form of a seismic wavefield; obtaining a set of seismic traces based on the acquired seismic data, each of the seismic traces including one or more detected samples of the seismic wavefield. Based on the seismic traces and a velocity model that represents velocity of the seismic energy propagating through the at least one seismic medium, reverse time migration (RTM) can be performed to generate a set of migrated gathers; e.g., wherein the migrated gathers have amplitude based at least in part on the RTM. The amplitudes of the migrated gathers can be corrected by computing synthetic seismograms to provide compensated gathers, performing amplitude versus offset and/or amplitude versus angle analysis of the compensated gathers, and generating a seismic image of subsurface structures in the survey area, based on the amplitude versus offset and/or amplitude versus angle analysis.

In some examples, the seismic model represents background velocity, and the amplitude may comprise distortion due at least in part to the RTM; e.g., where correcting the amplitudes comprises reducing the distortion. The amplitudes may be sufficiently corrected such that the resulting compensated gathers can be utilized for amplitude versus offset and/or amplitude versus angle analysis.

In some examples, the velocity model contains reflectivity contrasts, including a water bottom interface and salt-sediment boundaries. The velocity model may be anisotropic.

In some examples, the output domain for the migrated gathers is at least one of offset, sub-surface offset, time shift, or angle gather. For angle gather, the method may work irrespective of the angle transformation.

In some examples, computing synthetic seismograms comprises Born modeling. The velocity model used as input for RTM can also be used as input for correcting the amplitudes.

In some examples, inputs for correcting the amplitude further include a reflectivity grid model of the same or similar dimensions as the velocity model, and a source-receiver geometry that matches the geometry of the seismic traces. The reflectivity model may comprise a set of horizontal reflectors that span the space of the output migrated data.

Some examples include estimating a scalar correction filter based on a difference in amplitudes of the migrated gathers and the amplitudes of the input reflectivity model; e.g., where the scalar correction filter compensates for the distortion at each reflectivity horizon level. The method can also include interpolating the scalar filter in the depth axis and optionally in the offset or angle axis to produce a gridded volume of scalar filters, which are applied to the migrated gathers to provide compensated gathers. The computed synthetic seismograms can contain primary reflections created by the reflectivity model with amplitudes that are due solely to transmission effects, or that lack amplitude variations with offset introduced by elastic property contrasts of the real subsurface geology.

In some examples, the method includes migrating the synthetic seismograms with RTM to provide gathers in the same domain as the migrated gathers. The amplitude compensation can restore amplitudes in depth and offset, subsurface-offset, time shift, and angle.

A computer system can be provided with memory in communication with a computer processor, which is configured to execute a method according to any of the examples herein.

A method of geophysical exploration can include one or more steps of detecting, by a seismic receiver, seismic energy in the form of acoustic waves or other disturbances of at least one medium through which a seismic wavefield propagates; and obtaining a set of seismic traces based on the detected seismic energy, each trace including one or more detected samples of the seismic energy. Further steps can include generating or receiving a velocity model, and, based on the measured seismic traces and the velocity model, carrying out reverse time migration (RTM) to provide migrated gathers; e.g., where the migrated gathers may have amplitude distortions due to the RTM. The distorted amplitudes of the migrated gathers can be corrected by computing synthetic seismograms to provide compensated gathers, where the amplitudes are sufficiently corrected to that the resulting compensated gathers can be utilized for amplitude versus offset and/or amplitude versus angle analysis.

In some examples, the velocity model contains reflectivity contrasts, including a water bottom interface and salt-sediment boundaries. The velocity model may be anisotropic.

In some examples, the output domain for the migrated gathers is at least one of offset, sub-surface offset, time shift, or angle gather. For angle gather, the method can work irrespective of the angle transformation.

While this disclosure is directed to representative embodiments, other examples may be encompassed without departing from the scope of invention, as determined by the claims. While the invention may be described with respect to particular exemplary embodiments, it is understood that changes can be made and equivalents may be substituted to adapt the disclosure to different problems and application, while remaining within the spirit and scope of the invention as claimed. The invention is not limited to the particular examples that are described, but encompasses all embodiments falling within the scope of the claims.

The invention claimed is:

1. A method of seismic imaging, the method comprising:
obtaining seismic data acquired by a seismic receiver comprising at least one of a geophone and a hydrophone deployed to a seismic medium, the seismic data responsive to seismic energy generated by at least one seismic source and propagating through the seismic medium by reflection from a subsurface geology;
obtaining seismic traces based on the acquired seismic data, each of the seismic traces including one or more samples of the seismic energy;
generating migrated gathers by performing reverse time migration on the seismic traces using a velocity model of the seismic energy propagating through the seismic medium, wherein the migrated gathers have amplitudes based at least in part on the reverse time migration and the velocity model;
generating synthetic migrated seismograms based on the velocity model and a source-receiver geometry representative of the at least one source and the seismic receiver;
generating a filter based on the synthetic migrated seismograms;
generating amplitude compensated gathers from the migrated gathers, wherein the filter is applied to correct the amplitudes; and
generating a seismic image of the subsurface geology, based on the amplitude compensated gathers.

2. The method of claim 1, further comprising amplitude versus offset or amplitude versus angle analysis of the amplitude compensated gathers, or both, wherein the seismic image is based at least in part on the analysis.

3. The method of claim 1, further comprising numeric modeling of synthetic seismograms based on the velocity model and the source-receiver geometry and migrating the synthetic seismograms with reverse time migration to provide the synthetic migrated seismograms in a same output domain as the migrated gathers.

4. The method of claim 3, wherein the same output domain is at least one of offset, sub-surface offset, time shift, or angle gather.

5. The method of claim 3, wherein the numeric modeling is based on a reflectivity model of the seismic medium, the reflectivity model having same dimensions as the velocity model and being representative of a set of reflectors that span a space of the migrated gather, wherein the source-receiver geometry matches a geometry of the seismic traces.

6. The method claim 5, wherein the synthetic seismograms are representative of primary reflections based on the reflectivity model with amplitudes due to transmission effects, and wherein the synthetic seismograms lack amplitude variations with offset introduced by elastic property contrasts of the subsurface geology.

7. The method of claim 5, wherein generating the filter comprises estimating a scalar correction filter based on a difference in amplitudes of the migrated gathers and amplitudes of the reflectivity model, wherein the scalar correction filter compensates for a distortion at each reflectivity horizon level in the reflectivity model.

8. The method of claim 7, further comprising interpolating the scalar correction filter in one or more of a depth axis and an offset or angle axis to produce a gridded volume of scalar filters, wherein applying the filter comprises applying the scalar filters to the migrated gathers to provide the amplitude compensated gathers.

9. The method of claim 1, wherein the velocity model represents background velocity and the amplitudes comprise distortion due at least in part to the reverse time migration, and wherein correcting the amplitudes comprises reducing the distortion.

10. The method of claim 9, wherein the velocity model contains reflectivity contrasts including a water bottom interface, the velocity model being anisotropic.

11. A method of geophysical exploration, comprising:
detecting, by a seismic receiver, seismic energy in a seismic medium through which a seismic wavefield propagates;
obtaining seismic traces based on the detected seismic energy, wherein the seismic traces are responsive to the seismic wavefield being reflected from a subsurface geology;
reverse time migrating the seismic traces to generate migrated gathers based on a velocity model of the seismic medium, wherein the migrated gathers have amplitude distortion due to the reverse time migration;
numeric modeling of synthetic traces based on the velocity model and a source-receiver geometry matching a geometry of the seismic traces;
reverse time migrating the synthetic traces to generate synthetic migrated gathers;

generating amplitude compensated gathers from the migrated gathers, wherein a filter based on the synthetic migrated gathers is applied to at least partially correct the amplitude distortion; and generating a seismic image of the subsurface geology by performing one or both of amplitude versus offset and amplitude versus angle analysis of the amplitude compensated gathers.

12. The method of claim 11, wherein the velocity model is anisotropic and contains reflectivity contrasts including a water bottom interface.

13. The method of claim 11, further comprising performing the reverse time migrating of the synthetic traces to generate the synthetic migrated gathers in a same output domain as the migrated gathers, wherein the same output domain is at least one of offset, sub-surface offset, time shift, or angle gather.

14. The method of claim 11, further comprising generating the filter based on a difference in amplitudes of the synthetic migrated gathers and a reflectivity model of the seismic medium, the reflectivity model representing a set of reflectors that span a space of the migrated gathers.

15. The method of claim 14, further comprising estimating a scalar correction filter based on the difference in amplitudes of the synthetic migrated gathers and the reflectivity model, wherein the scalar correction filter at least partially compensates for the amplitude distortion.

16. The method of claim 15, further comprising interpolating the scalar correction filter in one or more of a depth axis and an offset or angle axis to produce a gridded volume of scalar filters and applying the scalar filters to the migrated gathers to generate the amplitude compensated gathers.

17. The method of claim 14, wherein the numeric modeling is based on the reflectivity model, the reflectivity model having same dimensions as the velocity model such that the synthetic traces are representative of primary reflections created by the reflectivity model.

18. The method of claim 17, wherein the synthetic traces have amplitudes representative of transmission effects and lack amplitude variations with offset introduced by elastic property contrasts of the subsurface geology.

19. A system comprising a computer processor and non-transitory memory for storing program code executable on the computer processor to perform a method of seismic imaging, the method comprising:

obtaining seismic traces based on seismic energy detected by a seismic receiver deployed to a seismic medium through which a seismic wavefield propagates, wherein the seismic traces are responsive to the seismic wavefield reflected from a subsurface geology;

reverse time migrating the seismic traces to generate migrated gathers based on a velocity model and a reflectivity model of the seismic medium, wherein the migrated gathers have amplitude distortion due to the reverse time migration;

numeric modeling of synthetic traces based on the velocity model, the reflectivity model of the seismic medium having a same dimension as the velocity model, and a source-receiver geometry matching a geometry of the seismic traces;

reverse time migrating the synthetic traces to generate synthetic migrated gathers;

generating a filter based on a difference in amplitudes of the synthetic migrated gathers and the reflectivity model, the reflectivity model representing a set of reflectors that span a space of the migrated gathers;

generating amplitude compensated gathers from the migrated gathers, wherein the filter is applied to at least partially correct the amplitude distortion; and generating a seismic image of the subsurface geology by performing one or both of amplitude versus offset and amplitude versus angle analysis of the amplitude compensated gathers.

20. The system of claim 19, wherein generating the filter comprises:

estimating a scalar correction filter based on the difference in amplitudes of the synthetic migrated gathers and the reflectivity model, wherein the scalar correction filter at least partially compensates for the amplitude distortion; and interpolating the scalar correction filter in one or more of a depth axis and an offset or angle axis to produce a gridded volume of scalar filters;

wherein applying the scalar filters are applied to the migrated gathers to generate the amplitude compensated gathers.

* * * * *